United States Patent [19]
Albrecht et al.

[11] Patent Number: 5,930,078
[45] Date of Patent: Jul. 27, 1999

[54] AUTOMATED HEAD WIRE STRINGING, TERMINATION, AND SLIDER BONDING SUSPENSION ASSEMBLY WITH LOAD/ UNLOAD FEATURE

[75] Inventors: David William Albrecht, San Jose, Calif.; Akihiko Aoyagi, Fujisawa, Japan; Wing Chun Shum, San Jose, Calif.

[73] Assignee: International Business Machines Corporation, Armonk, N.Y.

[21] Appl. No.: 08/646,517

[22] Filed: May 7, 1996

Related U.S. Application Data

[51] Int. Cl.⁶ ........................................................ G11B 5/48
[52] U.S. Cl. ............................................................. 360/104
[58] Field of Search ................................... 360/103, 104, 360/105

[56] References Cited

U.S. PATENT DOCUMENTS

| | | | |
|---|---|---|---|
| 3,665,434 | 5/1972 | Applequist et al. | 340/174.1 E |
| 4,280,156 | 7/1981 | Villette | 360/105 |
| 4,645,280 | 2/1987 | Gordon et al. | 339/17 |
| 4,755,892 | 7/1988 | Carteau et al. | 360/75 |
| 4,829,396 | 5/1989 | Okutsu | 360/105 |
| 4,835,644 | 5/1989 | Schulze | 360/106 |
| 5,006,946 | 4/1991 | Matsuzaki | 360/105 |
| 5,023,737 | 6/1991 | Yaeger | 360/105 |
| 5,027,241 | 6/1991 | Hatch et al. | 360/104 |
| 5,074,029 | 12/1991 | Brooks, Jr. et al. | 29/603 |
| 5,115,363 | 5/1992 | Khan et al. | 360/104 |
| 5,187,625 | 2/1993 | Blaeser et al. | 360/104 |
| 5,208,712 | 5/1993 | Hatch et al. | 360/98.01 |
| 5,331,489 | 7/1994 | Johnson et al. | 360/104 |
| 5,343,344 | 8/1994 | Nagase | 360/104 |
| 5,526,205 | 6/1996 | Aoyagi et al. | 360/104 |
| 5,557,489 | 9/1996 | Nakashima et al. | 360/104 |
| 5,572,387 | 11/1996 | Brooks, Jr. et al. | 360/104 |
| 5,590,095 | 12/1996 | Chaya | 360/105 |
| 5,612,841 | 3/1997 | Johnson | 360/104 |
| 5,657,186 | 8/1997 | Kudo et al. | 360/104 |
| 5,696,651 | 12/1997 | Endo et al. | 360/104 |

FOREIGN PATENT DOCUMENTS

| | | |
|---|---|---|
| 4-40680 | 5/1990 | Japan . |
| 4-321918 | 11/1992 | Japan . |
| 6-68445 | 3/1994 | Japan . |
| WO 94/12974 | 6/1994 | WIPO . |

*Primary Examiner*—Brian E. Miller
*Attorney, Agent, or Firm*—Jenkens & Gilchrist; Douglas R. Millett

[57] ABSTRACT

The invention is a suspension assembly with one or more head wires running across an upper surface of the suspension assembly; a flexure attached to a lower surface of the suspension assembly; a slider attached to a lower surface of the flexure; and a wiring window through which the one or more head wires pass to be attached to the slider. An alternative embodiment of the invention is a suspension assembly with a load/unload feature at a head end of the suspension assembly.

12 Claims, 9 Drawing Sheets

FIG. 13

AUTOMATED HEAD WIRE STRINGING, TERMINATION, AND SLIDER BONDING SUSPENSION ASSEMBLY WITH LOAD/ UNLOAD FEATURE

FIELD OF THE INVENTION

The present invention relates to the field of disk drives, also known as direct access storage devices ("DASD"). More particularly, the invention pertains to the automated manufacturing of a suspension assembly of a disk drive. The suspension assembly includes a load/unload feature.

BACKGROUND OF THE INVENTION

One of the key requirements of a computer system is a place to store data. Typically computer systems employ a number of storage means to store data. One of the places where a computer can store data is in a disk drive which is also called a direct access storage device ("DASD").

A disk drive or DASD includes several disks which look similar to records used on a record play or compact disks which are used in a CD player. The disks are stacked on a spindle, much like several 45 rpm records awaiting to be played. In a disk drive, however, the disks are mounted to the spindle and spaced apart so that the separate disks do not touch each other.

The surface of each disk is uniform in appearance. However, in actuality, the surface of each disk is divided into portions where data is stored. There are a number of tracks of the disk situated in concentric circles like rings on a tree. Compact disks have tracks as do the disks in a disk drive. The tracks in either the disk drive or the compact disk essentially replace the grooves on a conventional record. Each track in a disk drive is further subdivided into a number of sectors which is essentially just one section of the circumferential track.

Disks in a disk drive are made of a variety of materials. Most commonly, the disk is made of metal or plastic. The materials from which the disk is made determines how data is stored on the disk. A plastic disk, such as those used as CDs, stores data using lasers and a laser is used to read the data back. Storage of data on a metal disk entails magnetizing portions of the disk in a pattern which reflects the data.

To store data on a metal disk, the metal disk is magnetized. In order to magnetize the surface of a disk, a small ceramic block which contains a magnetic transducer known as a write head is passed over the surface of the disk. More specifically, the write head is flown at a height of approximately six millionths of an inch from the surface of the disk and is flown over the track as the write head is energized to various states causing the track below to be magnetized to represent the data to be stored.

To retrieve data stored on a magnetic disk, a ceramic block which contains a read head is flown over the metal disk. The magnetized portions of the disk induce a current in the read head. By looking at output from the read head, the data can be reconstructed for use by the computer system.

Typically, the same ceramic block contains both a read head and a write head.

Like a record, both sides of a disk are generally used to store data or other information necessary for the operation of the disk drive. Since the disks are held in a stack and are spaced apart from one another, both the top and the bottom surface of each disk in the stack of disks has a ceramic block, also known as a slider, associated with each surface. This would be comparable to having a stereo that could play both sides of a record at once. In the record analogy, each side would have a stylus which played the particular side of the record.

Disk drives also have something that compares to the tone arm of a stereo record player. There are two types of actuators, rotary and linear. Rotary disk drives have a tone arm that rotates much like a record player. The tone arm of a rotary disk drive, termed a suspension assembly, typically has one slider attached at one end. The other end of a suspension assembly is attached to a comb-like structure. There is one suspension assembly associated with each surface of each disk. The comb-like structure facilitates holding the suspension assembly.

Like a tone arm, the suspension assembly rotates so that the read and write heads in the slider which is attached to the suspension assembly can be moved to locations over various tracks on the disk. In this way, the write heads can be used to magnetize the surface of the disk in a pattern representing the data at one of the several track locations or the read heads can be used to detect the magnetized pattern on one of the tracks of a disk. For example, the needed data may be stored on two different tracks on one particular disk, so to read the magnetic representations of data, the suspension assembly is rotated from one track to another track. A linear disk drive, by contrast, has a linear suspension assembly with a suspension assembly similar to that of a rotary disk drive. However, in a linear disk drive, instead of repositioning by rotation, repositioning is accomplished through linear movement.

Both the read head and the write head attached to the slider require a pair of wires to be attached to the slider itself. Thus, a typical suspension assembly has a total of four wires. These wires are very fine and are about 0.0014 inches thick, which is about half the thickness of a human hair. The wires carry electrical signals. The electrical signals attached to the write head are used to store representations of data on one of the disk surfaces of the disk drive. The electrical signals attached to the read head are used to carry signals representing the data back from one of the surfaces of the disk which has data stored on it. A set of wires for each read and write head are strung along each of the actuator arms in the disk drives. Each set of wires for each of the read heads and write heads typically is attached to a flexible cable which allows the suspension assembly to move while maintaining electrical connection with each of the heads on the slider.

In the past, attaching the fine wires to the read heads and the write heads, stringing the wire along the suspension assembly and attaching the wire to the flexible cable has been a very labor intensive process. The fine wires were attached to the head and strung along the actuator arm by human beings. Much of the work was done under a microscope, especially attaching one pair of fine wires to the read head and one pair of fine wires to the write head. The pairs of wire were also strung along the suspension assembly by humans. Finally, the fine wires are attached to the flexible cable by people.

The past procedure has many shortcomings. Many of the shortcomings stem from the labor intensive nature of attaching the wires to the heads and flexible cable and stringing the wire along the suspension assembly. Basically, the wires are very fine and small and the places to which the wires attach on the slider also are very small. The attachment typically is done by soldering the ends of the wires to a small pad. This is very exacting and detailed work and by its nature is very prone to human error.

For example, the flexible cable includes pads which are spots on the flexible cable to which the ends of the wires from the various heads are attached. Since there are so many wires that must be attached to the flexible cable, the pads are very small and closely spaced. There are many possibilities for error in attaching the wires to the pads on the flexible cable. Prior to attaching the wires to the pads on the flexible cable, the wires must be sorted. On a disk drive having eight disks there are sixteen surfaces most of which have both a read and write head associated therewith. Assuming each surface has both a read and a write element and four wires. There are 64 very fine wires that must be sorted and attached to very small pads. The sorting process is tedious and very prone to mistakes.

Even after successfully sorting the various wires, the wires are soldered to pads that are very closely spaced. Attaching the wires is also a source of mistakes. It is difficult for a human to consistently apply just the right amount of solder to a pad without having it flow to a closely spaced adjacent pad. When it does flow to an adjacent pad, a short occurs so the electrical signal will not pass through the wires to the write head or from the read head.

The same types of problems occur when attaching the wires to the various read heads and write heads on the slider. Problems also occur since the work is not done uniformly and with consistency. One person, for example, may have a knack for accomplishing the tasks while another may take along time to learn the skill. As a result, there are various levels of quality from person to person.

Other problems occur since the wires are so fine. For example, the wires can be crimped as it is sorted out which may result in a break in the electrical signals to or from the write or read elements on the slider.

As can be seen, there are many shortcomings associated with a human doing the task of attaching the wires to the head, stringing the wires along the suspension, twisting the wires for the purpose of noise suppression, sorting the wires and attaching them to the flexible cable where the wires terminate. This process seems prone to error, especially considering that the wires and pads upon which they are attached are very small. Because of the difficulty of this process as performed by humans, the time needed is high and as a result the labor costs are also high. The cost of the suspension assemblies are also increased in that more of the parts may be defective when compared to an automated process. Consequently, there is a need for a process by which the entire process of stringing the wires along the actuator arm, terminating the wires, and bonding of the slider to the suspension assembly can be automated.

SUMMARY OF THE INVENTION

It is an object of the invention to provide an automated method for wiring head wires on a suspension assembly.

It is a further object of the invention to provide a load/unload feature on a suspension assembly that has head wires attached by an automated process.

The invention is a suspension assembly with one or more head wires running across an upper surface of the suspension assembly; a flexure attached to a lower surface of the suspension assembly; a slider attached to a lower surface of the flexure; and a wiring window through which the one or more head wires pass to be attached to the slider. Also claimed is a suspension assembly with a load/unload feature at a head end of the suspension assembly. Also claimed is a method for automated wiring of a suspension assembly comprising positioning the suspension assembly on a tool block and securing the head wires; rotating the suspension assembly vertical to the plane of the tool block and placing the slider in a slider nest; bonding the head wires to the slider and cutting off the excess wires; placing epoxy on the slider then returning the suspension assembly parallel to the plane of the tool block; and bonding the slider to the flexure with the epoxy.

It is an advantage of the invention that an automated method is provided to wire the head wires on a suspension assembly.

It is a further advantage of the invention that a wiring window is used to permit bending of the wires down under the load beam of the suspension assembly to be attached to the slider.

It is a further advantage of the invention that a suspension assembly manufactured with an automated wiring process has a load/unload feature for removing the slider from a disk in a disk drive when the disk drive is not operational.

DETAILED DESCRIPTION OF THE INVENTION

The invention relates to an article of manufacture known as a suspension assembly used in a disk drive and method for producing same. The invention can best be understood by reference to the drawings.

Figure 1:
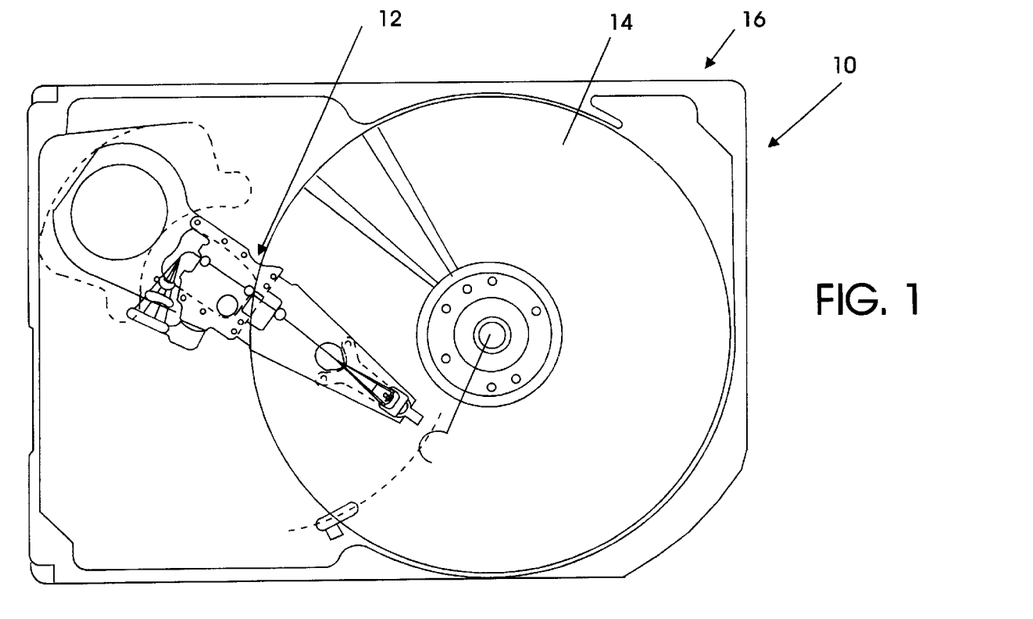
FIG. 1 is a top view diagram of a disk drive, showing the suspension assembly of the present invention.

FIG. 1 is a top view of a disk drive 10 showing the suspension assembly 12 of the present invention. Also shown is a sample disk 14 on which information is stored that needs to be accessed by an information handling system (i.e., computer, not shown). Also shown is the casing 16 surrounding and protecting the disk 14 and the suspension assembly 12. Although a rotary suspension assembly is shown, the invention applies to linear suspension assembly drives as well.

Figure 2:
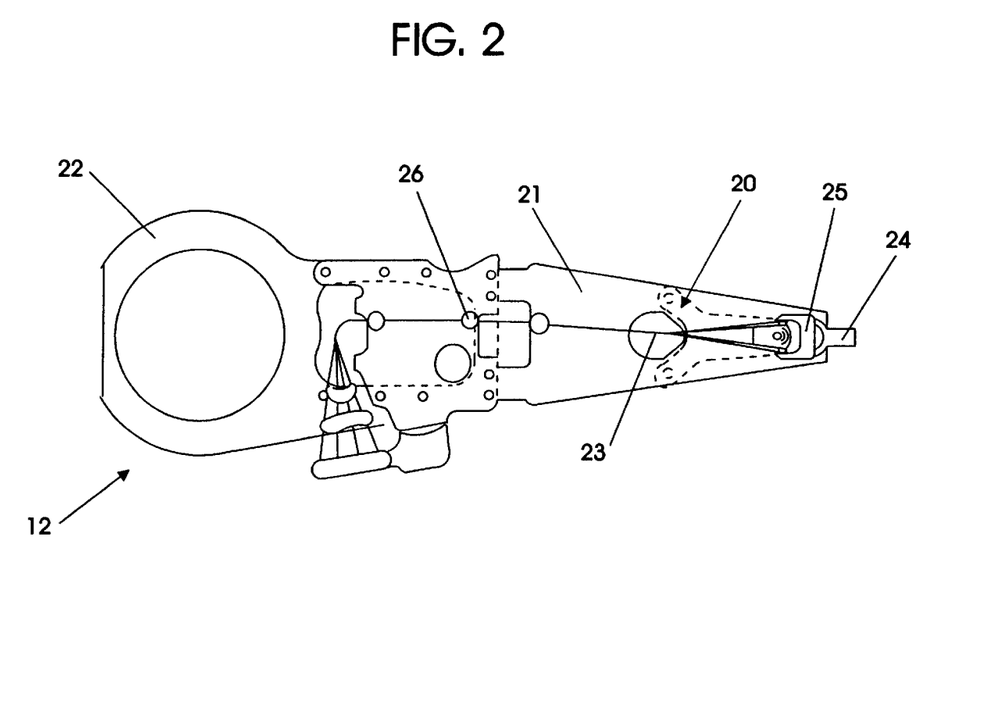
FIG. 2 is a top view diagram of a automatable wiring suspension assembly with load/unload feature of the present invention.

FIG. 2 is a top view diagram of the suspension assembly 12 of the present invention. FIG. 2 shows the overall design of the disclosed suspension assembly 12. The suspension assembly 12 consists of a slider 30 which is bonded to a flexure 20. The slider 30 rests underneath the flexure 20. The slider 30, thus, is not shown in the top view of FIG. 2. The slider 30 is shown in the side view of FIG. 3. The flexure 20 provides the slider 30 with appropriate pitch and roll stiffness which is important in accurately reading and writing information to and from a disk. As discussed in the background section, the slider 30 is used to read or write information from or to the disk 14 in a disk drive 10. The flexure 20 is welded onto a load beam 21. The load beam 21 provides the appropriate vertical load for optimal operation of the suspension assembly 12. A gimbling dimple 40 (shown in FIG. 4) to the slider 30 is attached to an arm 22. Head wires 23 are routed on top of the suspension assembly 12. The head wires 23 are contained within the height of the bent flanges 44 running along each edge of the load beam 21 for wire protection and z-height control. Two head wires 23 are connected to the read head on the slider 30 and two head wires 23 are connected to the write head on the slider 30.

The load/unload feature 24 is a lever which is used to load the slider 30 onto the disk 14 when the disk drive 10 is operational and to lift the slider 30 away from the disk 14 when the disk drive 10 is shut down. Removing the slider 30 away from the disk when not in use protects the disk 14 from being damaged by the slider 30 due to shock loading.

A key aspect of the invention is that the load/unload feature 24 is available on a suspension assembly 12 that has been produced by automated manufacturing. Near the tip of the assembly 12, there is a unique wiring window 25. The wiring window 25 exposes the front end of the slider 30 to which the wire termination pads 60 are attached. It is this wiring window 25 that enables the wiring, termination of the head wires 25 and bonding of the slider 30 to the flexure 20 to be automated. Also shown in FIG. 2 are various glue dots 26 that relieve the stress on the head wires.

Figure 3:
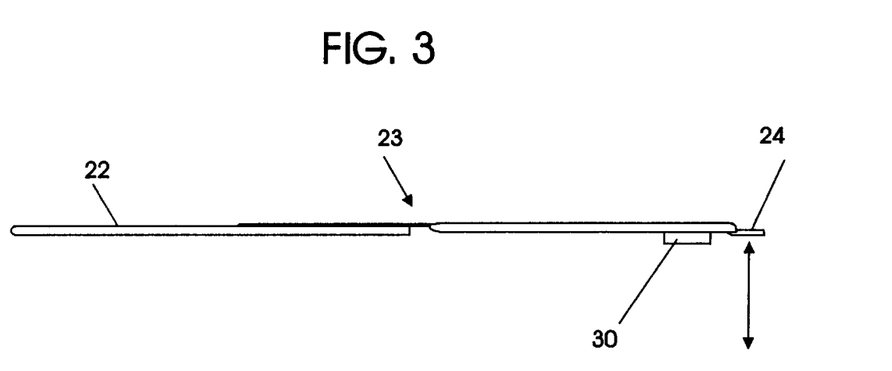
FIG. 3 is a side view diagram of an automatable wiring suspension assembly with load/unload feature of the present invention.

FIG. 3 is a side view diagram of a suspension assembly with load/unload feature of the present invention. FIG. 3 shows the arm 22, the load beam 21, the flexure 20, and the head wires 23. Also shown is the slider 30 and the load/unload feature 24. The load/unload feature 24, as indicated in FIG. 3, moves up and down in the y-direction. When the disk drive 10 is operational, the load/unload feature 24 is down and the slider 30 is on the disk 14. When the disk drive 10 is not operational, the load/unload feature 24 is up and the slider 30 is lifted away from the disk 14.

Figure 4:
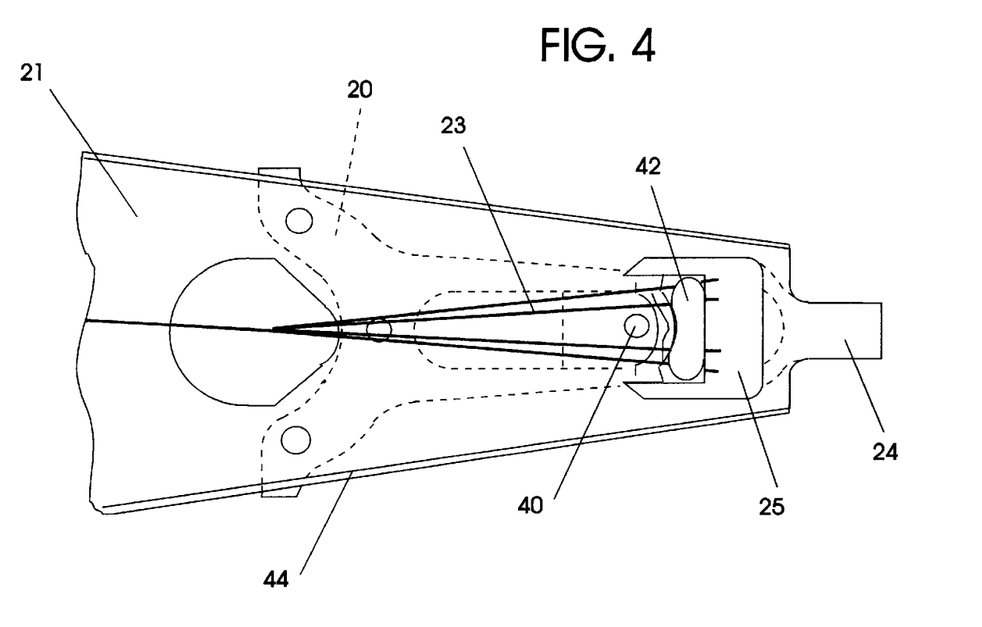
FIG. 4 is an expanded top view diagram of the head end of a automatable wiring suspension assembly with load/unload feature of the present invention.

FIG. 4 is an expanded view of the head end of FIG. 2. FIG. 4 shows the load beam 21 with the head wires 23 running across the top. The flexure 20 is underneath the load beam 21 and is therefore shown by dashed lines. A gimbling dimple 40 to the slider 30 is welded to the load beam 21. The function of the gimbling dimple 40 is to allow the slider 30 to rotate freely in the x-, y-, and z-direction as it moves across the disk 14. A large glue dot 42 is shown. The glue dot 42 is used to relieve the stress and tension on the head wires. Also shown is the wiring window 25 which permits automated wiring and termination of the head wires 23 as further described below. Finally, at the end of the load beam 21 is the load/unload feature 24. The bent flanges 44 serve to stiffen the suspension load beam 21 to increase the natural frequencies.

Figure 5:
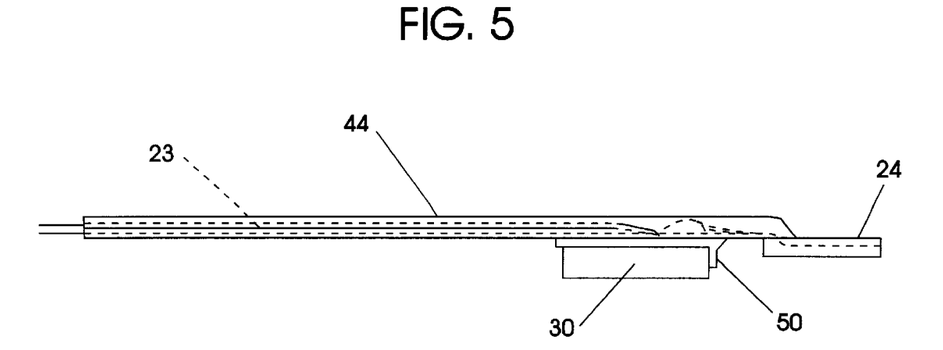
FIG. 5 is an expanded side view diagram of the head end of a automatable wiring suspension assembly with load/unload feature of the present invention.

FIG. 5 is an expanded side view diagram of the head end of FIG. 3. FIG. 5 shows the bent flanges 44 of the load beam 21. Running down the middle of the load beam 21 are the head wires 23. The head wires 23 in FIG. 5 are dashed since from the side they cannot actually be seen due to the upturned bent flanges 44 of the load beam 21. FIG. 5 shows the slider 30 which is attached to the lower portion of the flexure 20. FIG. 5 shows for the first time detail of the termination point 50 of the head wires 23. FIG. 5 makes it clear that the head wires 23 are bent down through the wiring window 25 and around the flexure 20 and affixed to the edge of the slider 30. Not shown here are the wire termination pads 60 on the side of the slider 30 to which the head wires 23 are attached. Also shown is the load/unload feature 24.

Figure 6:
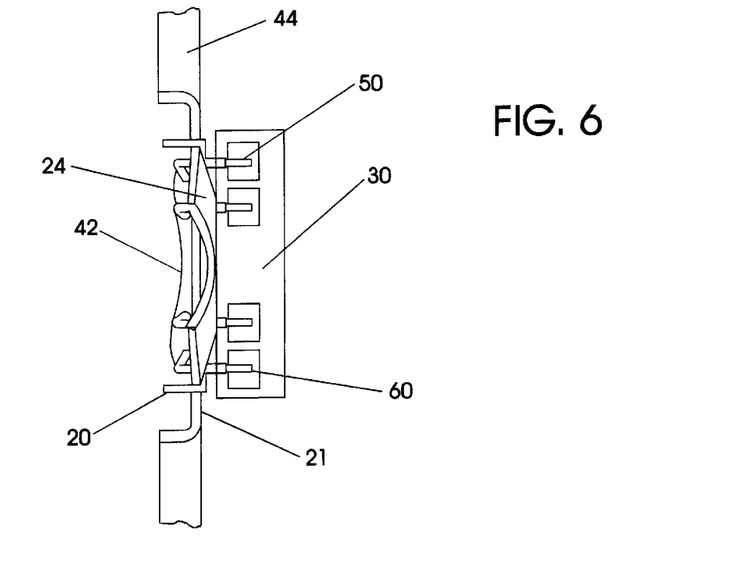
FIG. 6 is a front view diagram of the head end of a automatable wiring suspension assembly with load/unload feature of the present invention.

FIG. 6 is a front view diagram of the suspension assembly 12 of the present invention. FIG. 6 shows the bent flanges 44 running along the edges of the load beam 21. Also shown is the glue dot 42 that relieves the stress and tension on the head wires 23. FIG. 6 shows in detail the termination point 50 of the head wires 23 as they bend down through the wiring window 25 (not labeled on this diagram) at the end of the flexure 20 and are attached to the wire termination pads 60 at the edge of the slider 30.

FIGS. 7 through 12 show how this suspension assembly 12 design accomplishes the automation of head wire 23 routing, head wire 23 termination, and bonding of the slider 30 to the flexure 20.

Figure 7:
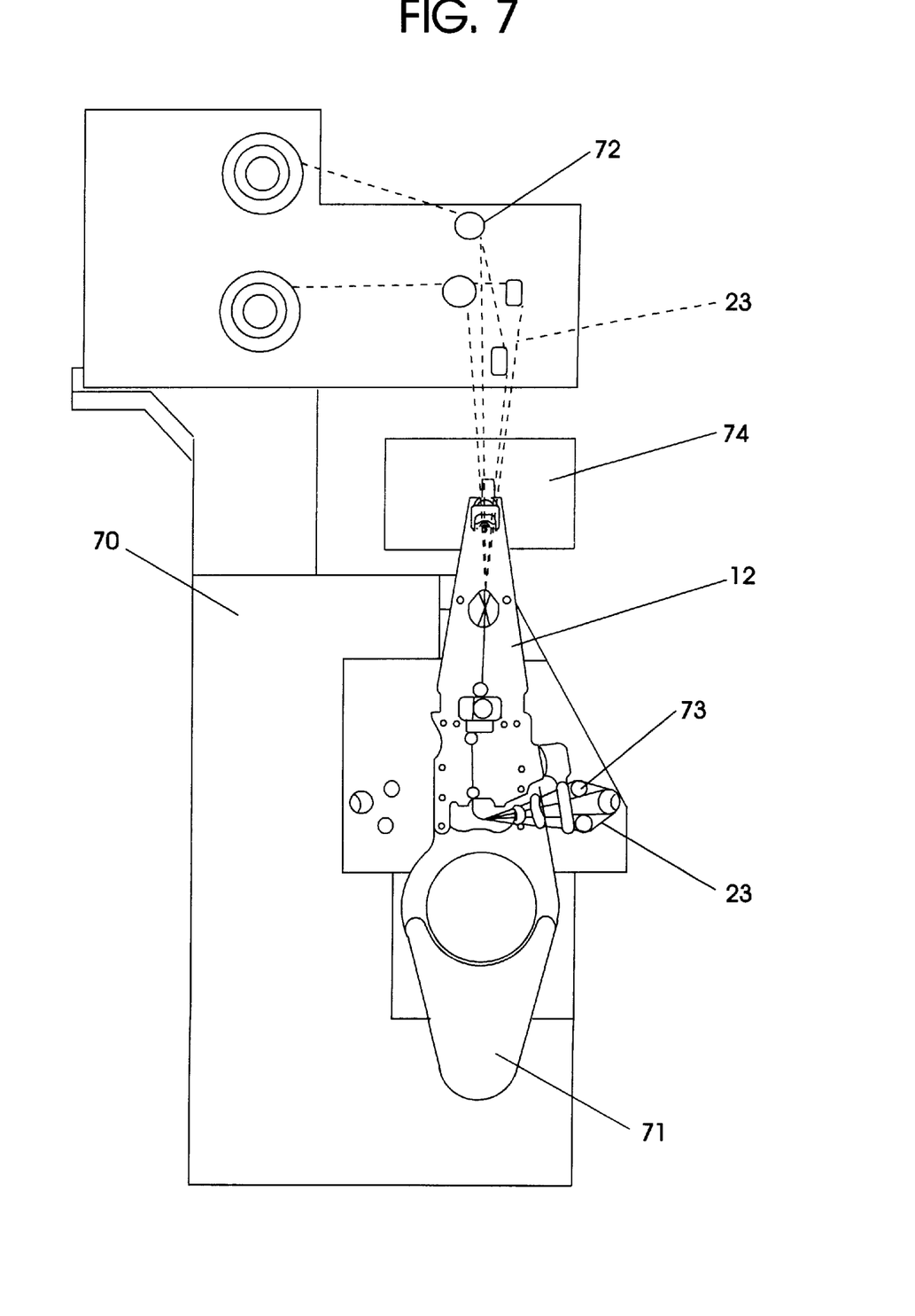
FIG. 7 is a top view diagram of the suspension assembly of the present invention positioned and clamped on a tool block.

FIG. 7 shows a top view of the suspension assembly 12 positioned on a rotatable portion of a tool block 70. The suspension assembly 12 is clamped to the tool block with clamp 71. Head wires 23 are routed on the suspension assembly 12 by a robot (not shown) or other automated means. The head wires 23 are precisely positioned on the suspension assembly 12 by two sets of wire routing pins 72 and 73 on either end of the suspension assembly 12. The head wires 23 are then strain relieved by glue dot 42 on the suspension assembly 12. Also shown in FIG. 7 is the slider nest 74 which is used to hold the slider for termination of the head wire 23 and for bonding of the slider 30 to the flexure 20.

FIGS. 8 through 12 show a cross-sectional view through part of the suspension assembly 12 and the tool block 70. FIGS. 8 through 12 are drawn in chronological order to show the process flow of the automated routing of the head wires 23, termination of the head wires 23, and bonding of the slider 30 to the flexure 20 processes of the present invention.

Figure 8:
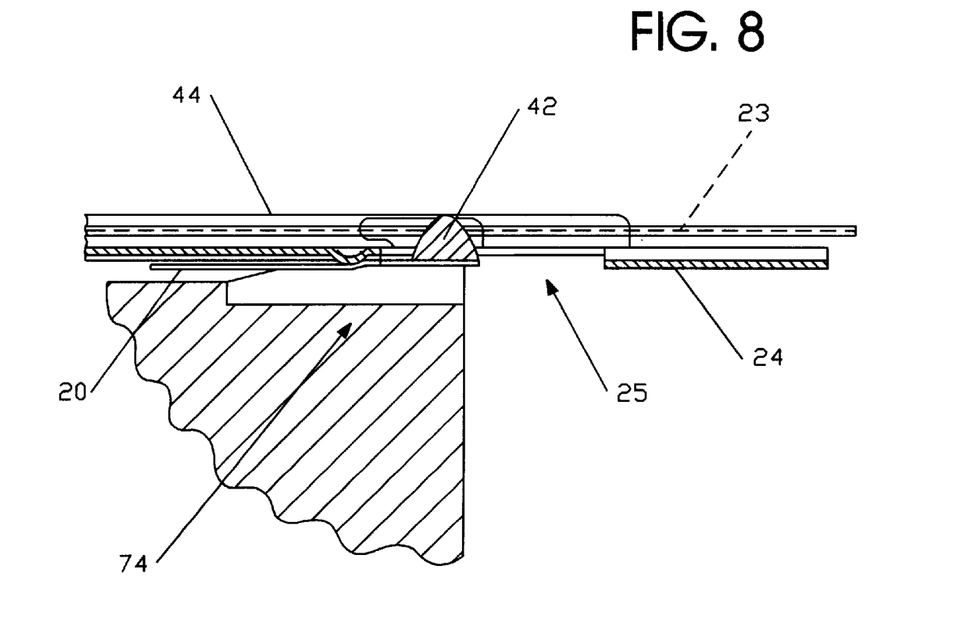
FIG. 8 is a cross-section view of step 1 of the automated process of the present invention showing the routed and strain relieved wires on the suspension assembly and the slider nest.

FIG. 8 shows a side view of the routed and strain relieved head wires 23 on the suspension assembly 12. FIG. 8 shows a sample glue dot 42 that is used to relieve the strain on the head wires 23. This Figure also shows part of the slider nest 74 which will be used to hold the slider 30 for termination of the head wires 23 and bonding of the slider 30 to the flexure 20 later in the process. Also shown in FIG. 8 are the bent flanges 44 along the sides of the load beam 21; the flexure 20 and load/unload feature 24. The wiring window 25 is important in the process of terminating the head wires 23.

Figure 9:
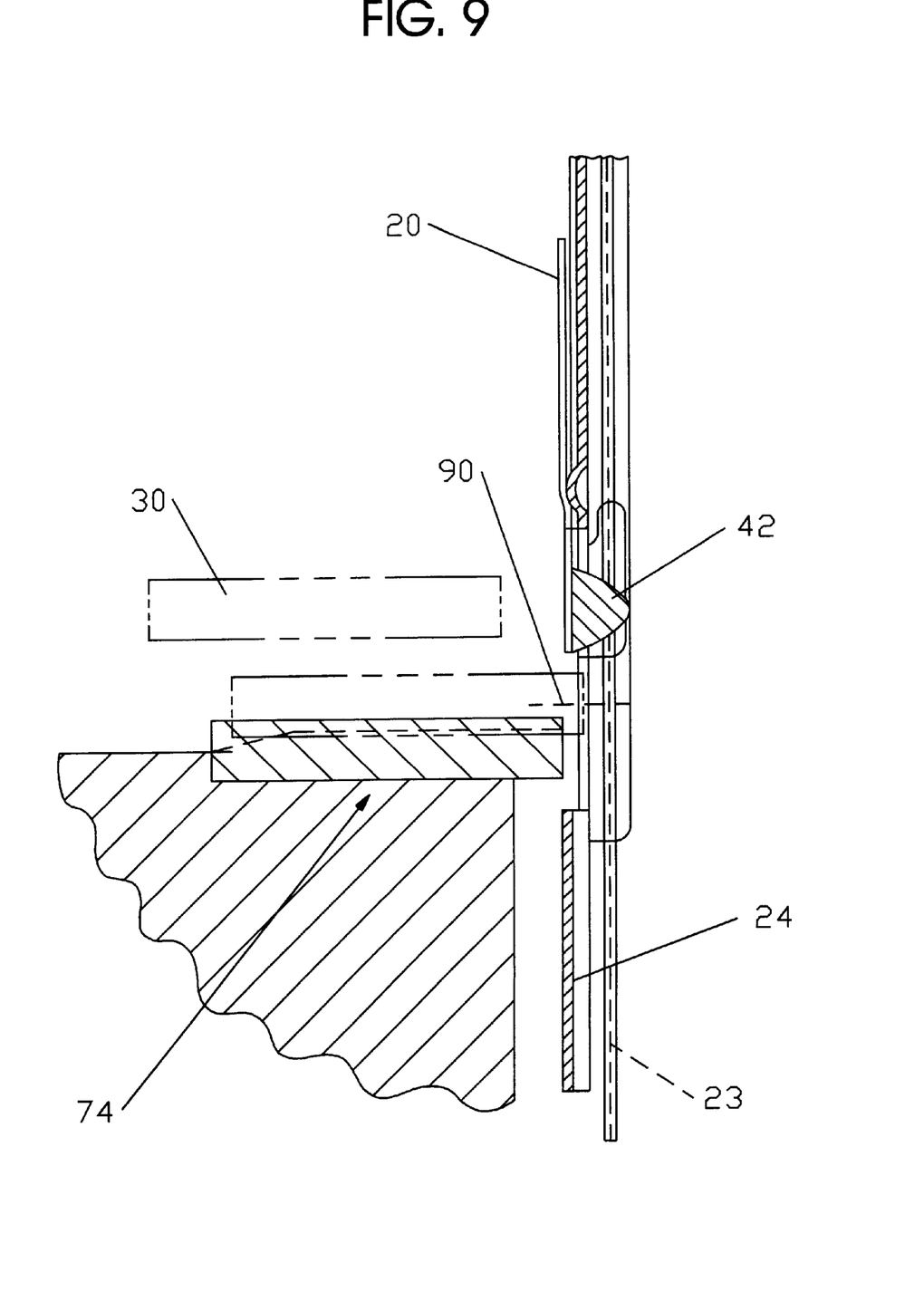
FIG. 9 is a cross-sectional view of step 2 of the automated process of the present invention showing rotation of the tool block to insert the slider into the slider nest.

After the head wires 23 are strung and strain relieved, the part of the tool block 70 which holds the suspension assembly 12 is rotated ninety degrees clockwise around a predetermined center of rotation 90 on the tool block 70 as shown in FIG. 9. The suspension assembly 12 is then perpendicular to the tool block 70. The slider 30 can be rotated to achieve the same result, but the preferred way is to rotate the suspension assembly 12 for process compatibility reasons. The slider 30 is then placed into the slider nest 74. As shown in FIG. 9, the slider nest 74 does not rotate with the suspension assembly 12. The wire termination pads 60 on the edge of the slider 30 are lined up with the head wires 23 and the head wires 23 are ready for termination at this point.

Figure 10:
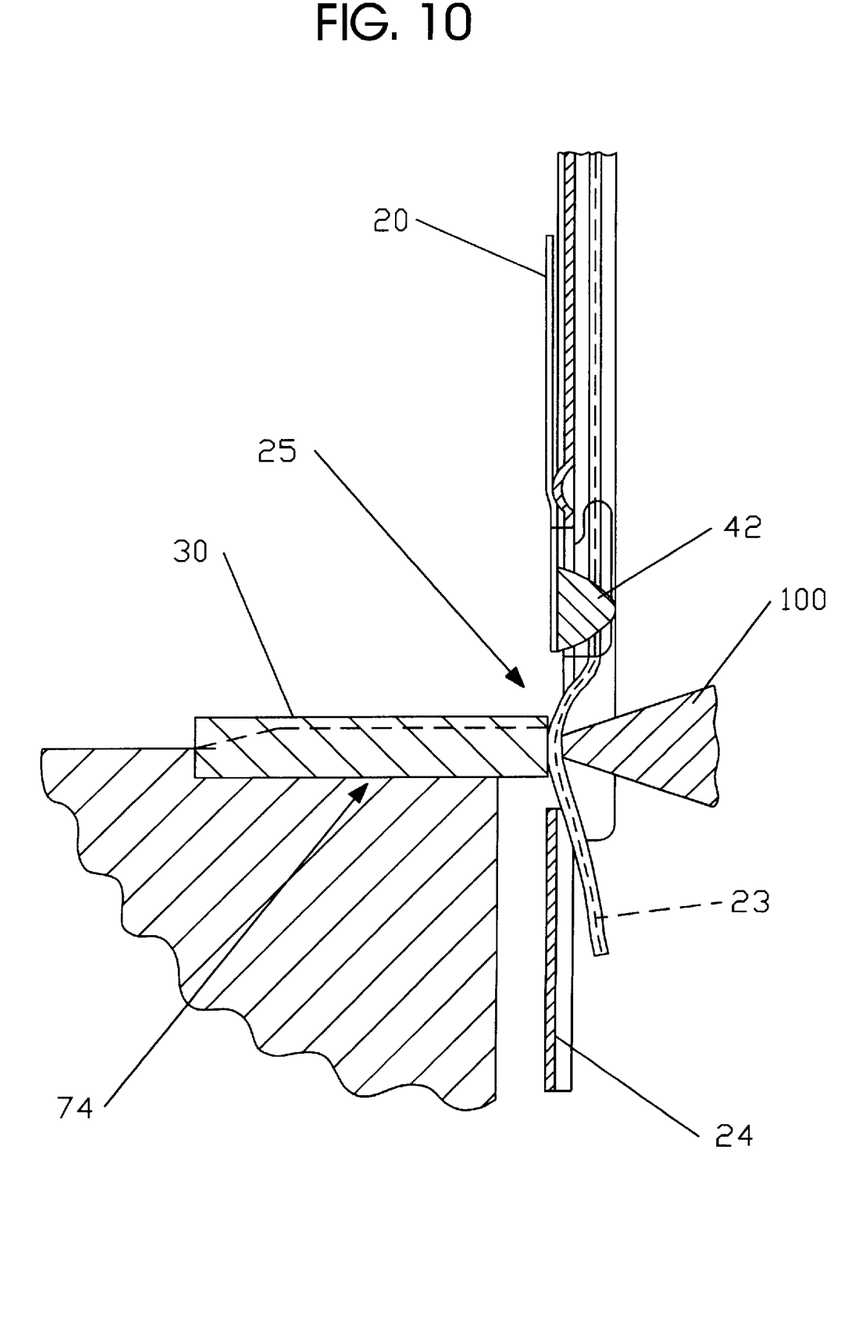
FIG. 10 is a cross-sectional view of step 3 of the automated process of the present invention showing the head wires terminating onto the wire termination pads with an ultrasonic bonding tool.

FIG. 10 shows the head wires 23 are then terminated onto the termination pads 60 with an ultrasonic bonding tool 100. The bonding tool 100 pushes the head wires 23 through the wiring window 25 and makes contact with the termination pads 60 on the slider 30. The head wires 23 are then ultrasonically bonded to the termination pads 60. After ultrasonic bonding, excess head wires 23 are then cut off.

Figure 11:
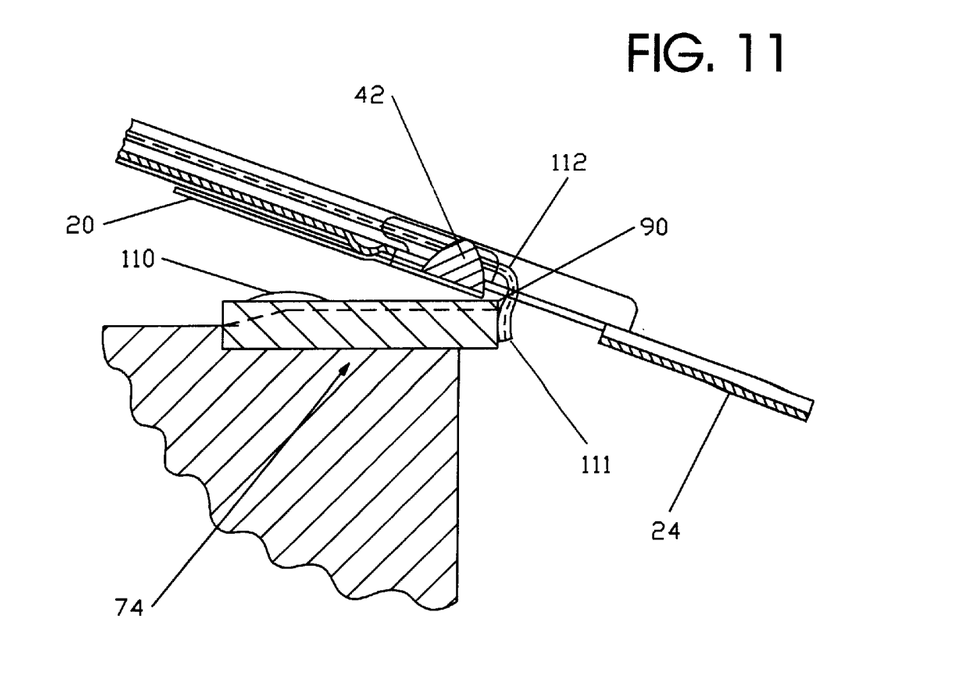
FIG. 11 is a cross-sectional view of step 4 of the automated process of the present invention showing the application of epoxy to attach the slider to the flexure and rotation of the suspension assembly.

As shown in FIG. 11, epoxy 110 is dispensed onto the slider 30 for bonding of the slider 30 to the flexure 20. The suspension assembly 12 is then rotated counter-clockwise as shown in FIG. 11 until the assembly once again sits parallel to the tool block 70. As the suspension is rotated, the head wires 23 are being constrained on one side by a glue dot 42 and on the other side by the wire termination pads 60 on the slider 30. A ninety degree bent loop 112 is formed on the head wires 23. The shape and dimension of the loop 112 is determined by the location of the center of rotation 90 of the suspension assembly 12.

Figure 12:
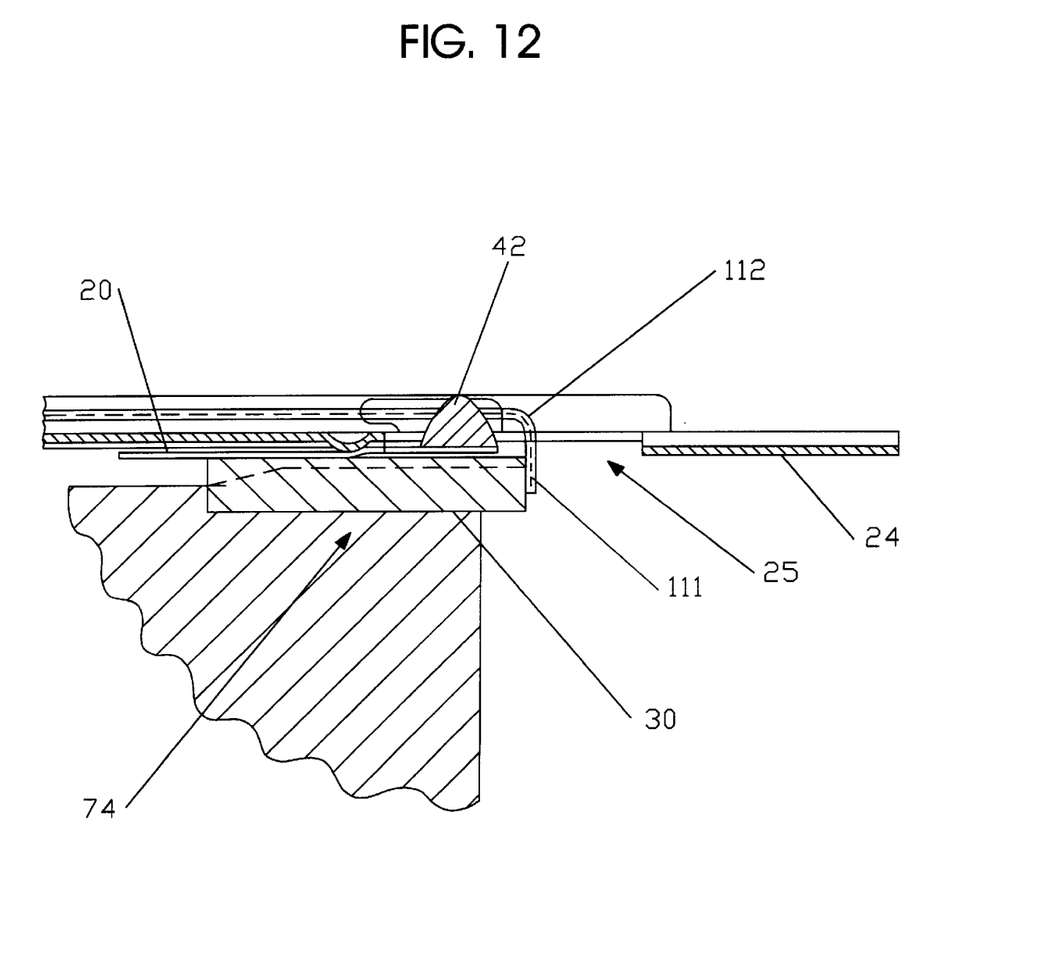
FIG. 12 is a cross-sectional view of step 5 of the automated process of the present invention showing the slider bonded to the flexure.

As the suspension assembly 12 is rotated back to the horizontal position, the flexure 20 is compressed slightly by the slider 30. Since epoxy 110 has been dispensed onto the slider 30 earlier as part of step 4, the epoxy 110 is spread between the flexure 20 and the slider 30. The epoxy 110 is then cured and the slider 30 is bonded onto the flexure 20 as shown in FIG. 12.

Figure 13:
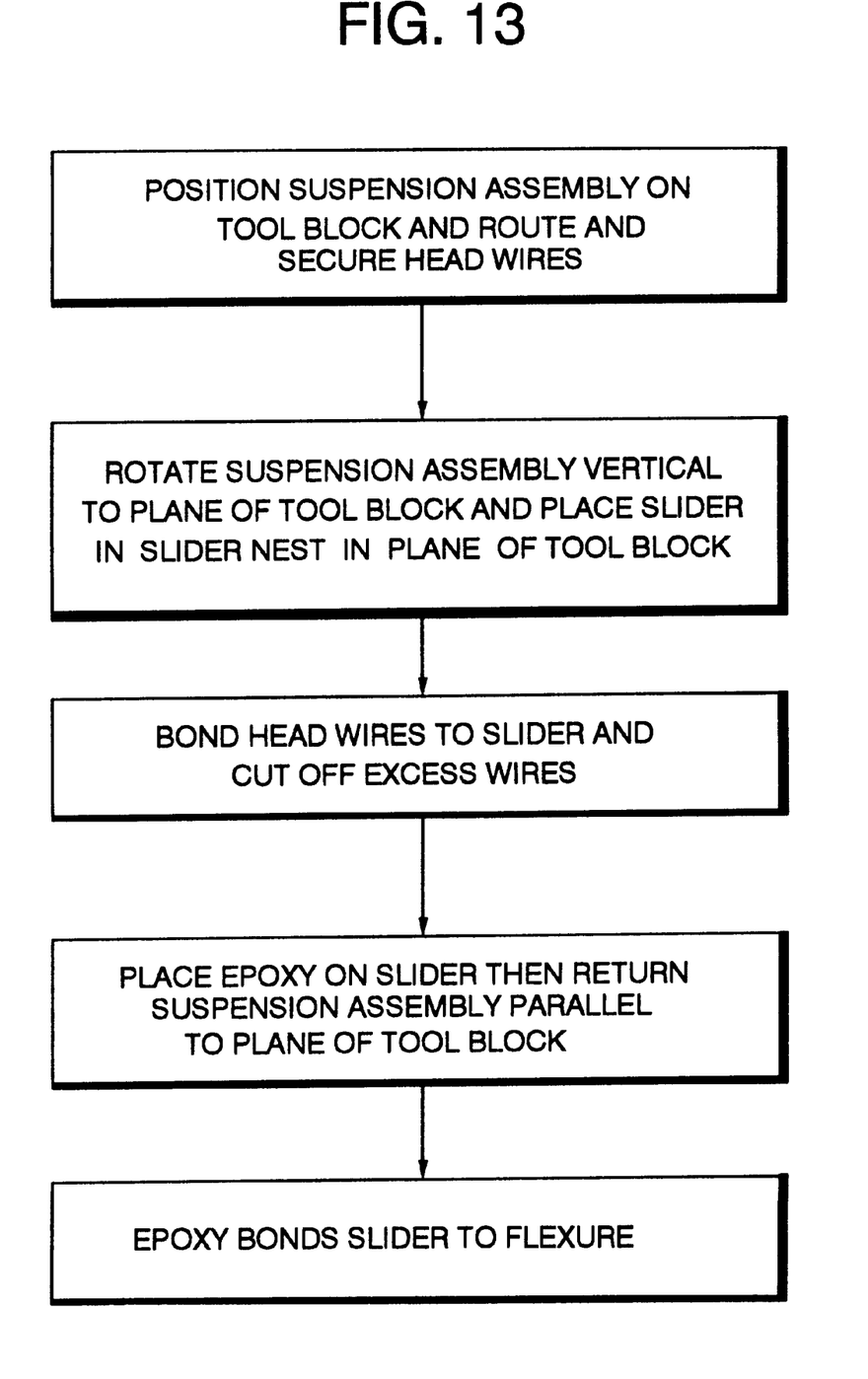
FIG. 13 is a flow chart summarizing the method of the automated process to wire a suspension assembly with load/unload features in accordance with the present invention.

FIG. 13 is a flowchart of the method of the automated process to wire a suspension assembly 12 with load/unload feature 24 in accordance with the present invention. FIG. 13 summarizes the steps in the process shown in FIGS. 8 through 12. As shown in FIG. 13, the first step in the process is to place the suspension assembly 12 on a rotatable portion of a tool block 70 and secure it. The flexure 20 is placed over a depression in the rotatable portion of the tool block 70 called the slider nest 74. The suspension assembly 12 is secured to the tool block by clamps 71. The initial wiring of the head wires 23 is completed in step 1 by securing the four head wires 23 around wiring pins 73, then down the center of the suspension assembly 12 where the head wires 23 are supported by the glue dots, such as glue dot 42. The head wires then are secured at the head end of the suspension assembly 12 by further wiring pins 72. The first step is further described in FIGS. 7 and 8 and the accompanying text.

In the second step, the suspension assembly 12, together with the rotatable portion of the tool block 70 is rotated ninety degrees clockwise until the suspension assembly 12 is perpendicular to the plane of the tool block 70. The slider nest 74 remains in the same plane as the tool block 70. In step 2, the slider 30 is inserted into the slider nest 74. The slider 30, at the time of insertion, already has wire termination pads 60 which are aligned with the head wires 23 as the slider 30 is inserted into the slider nest 74. The second step is further described in FIG. 9 and the accompanying text.

In the third step, the head wires 23 are terminated onto the wire termination pad 60 on the end of the slider 30. The head wires 23 are terminated using an ultrasonic bonding tool 100. The bonding tool 100 pushes the wires 23 down around the edge of the flexure 20 and through the wiring window 25 until the wires make contact with the wire termination pads 60. The wires 23 are then ultrasonically bonded to the wire termination pads 60, with one wire 23 attached to each of the four wire termination pads 60. The excess wire 23 that extends beyond the wire termination pads 60 is then cut off and discarded. The third step of the process is further described in FIG. 10 and the accompanying text.

In the fourth step, epoxy 110 is placed on top of the slider 30. The suspension assembly 12 then is rotated back to once again lie parallel to the took block 70. The head wires 23 are constrained by a glue dot 42 and by the termination pads 60 on the slider 30. A ninety-degree bent loop 112 is formed by the head wires 23 as the rotation is carried out. Step four is further described in FIG. 11 and the accompanying text.

In the fifth step, the slider 30 is bonded to the flexure 20 by the epoxy 110. Step five is further described in FIG. 12 and the accompanying text.

What is claimed is:

1. A transducer suspension system comprising:
   a load beam having a first support end for attachment to a support member and a second distal end, and having an upper and a lower surface, a pair of support flanges located along the upper surface, and which extend to the distal end of the load beam, a through hole window passing from the upper surface to the lower surface, the window located proximate to the distal end and between the two support flanges, such that a plane located perpendicular to a longitudinal axis of the load beam intersects both flanges and the window, the window having an uninterrupted width greater than the width of a front surface of a slider/transducer assembly, wherein the area of the front surface of the slider/transducer assembly will fit within the area of the window, the load beam also having a tab member which extends from the distal end;
   a flexure connected to the lower surface of the load beam;
   the slider/transducer assembly connected to a lower surface of the flexure, the front surface of the slider/transducer assembly being located below the uninterrupted width of the window, such that the entire front surface of the slider/transducer assembly is accessible through the window; and
   a plurality of electrical conducting elements which are connected to the top surface of the load beam and extend through the window and are connected to the front surface of the slider/transducer assembly.

2. The system of claim 1 wherein, the tab member has a convex lower surface.

3. The system of claim 1, further comprising:
   a glue drop attaching the conducting elements to the upper surface of the load beam at a location proximate to the window.

4. The system of claim 1, wherein a transducer on the slider/transducer assembly is located on the front surface of the slider/transducer assembly.

5. The system of claim 4, wherein the conducting elements are bent at an angle of approximately 90 degrees proximate to the window and are electrically connected to the transducer.

6. The system of claim 1, wherein the front surface of the slider/transducer assembly will fit through the window if the slider/transducer assembly is rotated 90 degrees such that the front surface of the slider/transducer assembly is parallel to the upper surface of the load beam.

7. A transducer suspension system comprising:

a load beam having a first support end for attachment to a support member and a second distal end, and having an upper and a lower surface, a pair of support flanges located along the upper surface, and which extend to the distal end of the load beam, a through hole window passing from the upper surface to the lower surface, the window located proximate to the distal end and between the two support flanges, such that a plane located perpendicular to a longitudinal axis of the load beam intersects both flanges and the window, the window having an uninterrupted width greater than the width of a front surface of a slider/transducer assembly, wherein the area of the front surface of the slider/transducer assembly will fit within the area of the window, the load beam also having a tab member which extends from the distal end;

a flexure connected to the lower surface of the load beam;

the slider/transducer assembly connected to a lower surface of the flexure, the front surface of the slider/transducer assembly being located below the uninterrupted width of the window, such that the entire front surface of the slider/transducer assembly is accessible through the window;

a plurality of electrical conducting elements which are connected to the top surface of the load beam and extend through the window and are connected to the front surface of the slider/transducer assembly;

a support member attached to the load beam;

a data storage media located proximate to the slider/transducer assembly;

a device for moving the media; and a device for moving the support member.

8. The system of claim 7 wherein, the tab member has a convex lower surface.

9. The system of claim 7, further comprising:

a glue drop attaching the conducting elements to the upper surface of the load beam at a location proximate to the window.

10. The system of claim 7, wherein a transducer on the slider/transducer assembly is located on the front surface of the slider/transducer assembly.

11. The system of claim 10, wherein the conducting elements are bent at an angle of approximately 90 degrees proximate to the window and are electrically connected to the transducer.

12. The system of claim 7, wherein the front surface of the slider/transducer assembly will fit through the window if the slider/transducer assembly is rotated 90 degrees such that the front surface of the slider/transducer assembly is parallel to the upper surface of the load beam.

* * * * *